United States Patent [19]

Lassche

[11] Patent Number: 4,665,767
[45] Date of Patent: May 19, 1987

[54] BICYCLE PEDAL WITH FOOT HOLDER

[76] Inventor: Jakob Lassche, No. 45, Wiesenwegle, 7230 Schramberg, Fed. Rep. of Germany

[21] Appl. No.: 835,429

[22] Filed: Mar. 3, 1986

Related U.S. Application Data

[63] Continuation of Ser. No. 522,233, Aug. 11, 1983, abandoned.

[30] Foreign Application Priority Data

Aug. 31, 1982 [NL] Netherlands .......................... 8203406

[51] Int. Cl.⁴ .............................................. G05G 1/14
[52] U.S. Cl. .................................. 74/594.6; 74/594.7
[58] Field of Search ................. 74/594.6, 594.4, 594.1, 74/594.2, 594.5, 594.3, 560, 563; 280/11.3, 11.31, 11.32, 11.33, 11.34, 613, 617–620; 36/117, 120, 122, 131, 132

[56] References Cited

U.S. PATENT DOCUMENTS

| | | | |
|---|---|---|---|
| 859,684 | 7/1907 | McMonies | 74/594.6 |
| 3,303,720 | 2/1967 | Jaulmes | 74/594.7 |
| 3,592,076 | 7/1971 | Baginski | 74/594.6 |
| 3,788,163 | 1/1974 | Gausse et al. | 74/594.7 |

FOREIGN PATENT DOCUMENTS

| | | | |
|---|---|---|---|
| 568621 | 3/1924 | France | 74/594.6 |
| 993958 | 11/1951 | France | 74/594.6 |
| 2310914 | 12/1976 | France | 74/594.6 |
| 2401823 | 3/1979 | France | 74/594.6 |
| 2407121 | 5/1979 | France | 74/594.6 |
| 2431948 | 2/1980 | France | 74/594.6 |
| 2432427 | 4/1980 | France | 74/594.6 |
| 2465635 | 4/1981 | France | 74/594.6 |
| 2485226 | 12/1981 | France | 74/594.6 |
| 2502100 | 9/1982 | France | 74/594.6 |
| 459608 | 1/1937 | United Kingdom | 74/594.6 |
| 703040 | 1/1954 | United Kingdom | 74/594.6 |
| 2101943 | 1/1983 | United Kingdom | 74/594.6 |

*Primary Examiner*—Gary L. Smith
*Assistant Examiner*—Vinh Luong
*Attorney, Agent, or Firm*—Birch, Stewart, Kolasch & Birch

[57] ABSTRACT

A bicycle pedal comprising a pedal shaft firmly connectable with a treadle frame of a bicycle, a pedal body rotatably journalled on the pedal shaft and a tightenable foot holder connected with the pedal body.

As for safety reasons it is essential that the pedal free the foot of the user when e.g. an accident occurs, such a foot pedal is provided, which is characterized in that the pedal body comprises at least two pedal parts relatively movable between an open position and a closed position, a tightening arrangement is connected with the pedal parts and tightens the foot holder during the movement from the open to the closed position and a manually operable locking arrangement retains the pedal parts in the closed position.

13 Claims, 10 Drawing Figures

BICYCLE PEDAL WITH FOOT HOLDER

This application is a continuation of application Ser. No. 522,233 filed on Aug. 11, 1983 now abandoned.

BACKGROUND OF THE INVENTION

1. Field of the Invention

The invention relates to a bicycle pedal comprising a pedal shaft firmly connectable with a treadle frame of a bicycle, a pedal body rotatably journalled on the pedal shaft and a tightenable foot holder connected with the pedal body.

2. Description of the Prior Art

In such a bicycle pedal known to be used on sports bicycle the foot holder comprises a belt that can be tightened with the aid of a clasp. Tightening such a foot holder is troublesome, particularly in doing so at a stand-still without being able to put the foot on the ground. Then an assistant is required or one has to lean somewhere. Before coming to a standstill the clasps have to be released so that the feet get free to find support on the ground. Consequently the use of these known bicycle pedals with foot holders gives rise to trouble and hazards when falling down, since it is difficult and time-consuming to free the feet from the pedals.

SUMMARY OF THE INVENTION

The invention has for its object to provide a bicycle pedal of the kind set forth in the preamble which does not exhibit these disadvantages.

In a bicycle pedal embodying the invention this is achieved in that the pedal body comprises at least two pedal parts relatively movable between an open and a closed position, tightening means connected with the pedal parts and tightening the foot holder during the movement from the open position into the closed position and manually operable locking means retaining the pedal parts in the closed position. In this way the foot holder is automatically tightened during the movement of the pedal body into the closed position. By a simple, very fast movement of the hand the locking means can be disengaged to set the foot free.

Even this simple movement of the hand is not required when in a preferred embodiment of the invention first releasing means actively connected with the pedal shaft and the locking means are provided so as to become operative during a rotation opposite the normal, relative rotation of the pedal body and the pedal shaft and to disable the locking means. Thus simply by back pedalling the pedal parts can be moved from the closed position into the open position, in which the foot holder again releases the foot concerned.

A generally known danger involved in the hitherto used foot holders resides in that when the user falls down with the bicycle his fastened feet may be injured, whilst it will take some time before he can unclasp the foot holders so that for some time he is an obstacle in traffic and hence exposed to all risks thereof.

A particularly advantageous embodiment of the bicycle pedal with a foot holder in accordance with the invention is provided with second releasing means actively connected with the locking means and comprising a laterally movable inertia element which becomes operative in the event of a drop of the bicycle to the side. Immediately at an imminent such a drop or falldown said second releasing means release the foot holder so that the user can step off the road with his bicycle.

A simple, but effective embodiment of the bicycle pedal in accordance with the invention is obtained when the pedal parts comprise a lower pedal rotatably journalled on the pedal shaft and an upper pedal pivoted thereto at a front end between the open and the closed position, whilst the upper pedal comprises guide means for guiding a flexible belt portion of the foot holder transversely through the rear end of the upper pedal opposite the front end and at least the lower pedal comprises extensions near the rear end which leave the belt portion free in the open position and urge it into zigzag shape in the closed position.

When the locking means comprise a locking pin extending in the direction from the front end to the rear end and being slidable and urged into an operative position by a tension spring, a simple and reliable design of the invention is obtained.

The second releasing means may comprise a catch movably arranged in the pedal body with a member adapted to engage the locking means, a retractable guard element retaining the catch in the rest position, a releasing spring urging the catch into a position in which the locking means are released and transmission means retracting the guard element during lateral movements of the inertia element and being connected with the guard element and the inertia element.

When in accordance with a further aspect of the invention the catch has a stop face for the tension spring, the tension spring does not counteract the releasing spring at an actuation of the second releasing means, so that a sensitive operation is ensured.

When in accordance with a further development of the invention the releasing spring is in engagement with a tension arm connected with the other pedal part than that comprising the catch, the releasing spring is automatically stretched when the pedal parts move from the open position into the closed position so that this releasing spring need not be separately stretched when the second releasing means have been operative.

BRIEF DESCRIPTION OF THE DRAWINGS

Further features and advantages of the invention will become apparent from the following description of a few embodiments of the invention with reference to the accompanying drawings.

DETAILED DESCRIPTION OF PREFERRED EMBODIMENTS

The bicycle pedal 1 comprises a pedal shaft 3 rigidly fastened to the crank arm 2 of the bicycle, a pedal body 4 rotatably journalled on the pedal shaft 3 and a foot holder 5 connected with the pedal body 4. The foot holder 5 comprises a bracket 6 and a belt 7. In the belt 7 is included a clasp 8 by means of which the belt 7 can be set to measure.

According to the invention the pedal body 4 comprises an upper pedal 9 and a lower pedal 10. The lower pedal 10 is directly journalled on the pedal shaft 3. The upper pedal 9 is pivotally connected with the lower pedal at the front end of the pedal body 4 by means of a pivotal shaft 11.

Figure 1:
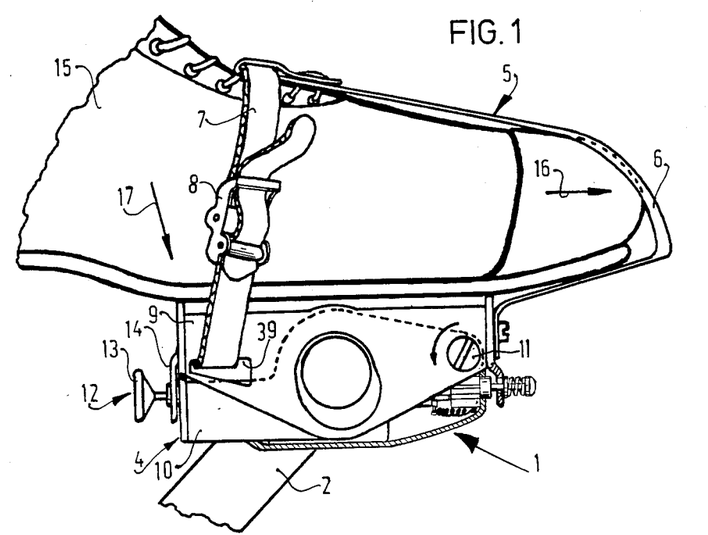
FIG. 1 is a side elevation of a bicycle pedal embodying the invention in the closed position.
Figure 2:
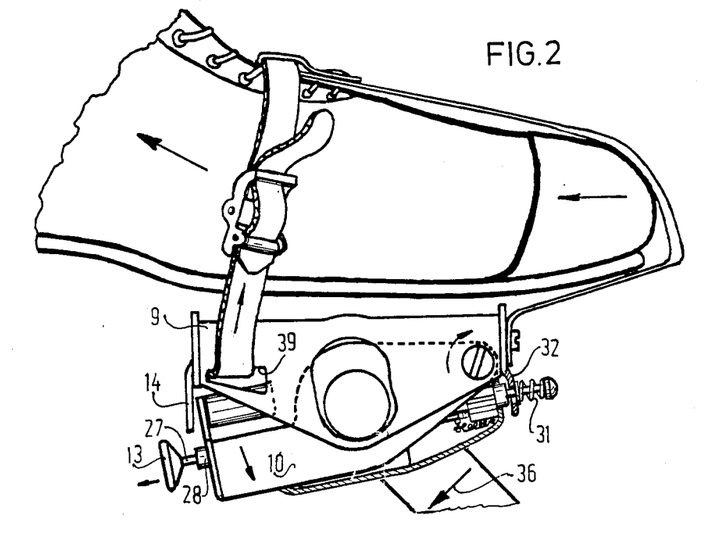
FIG. 2 shows the bicycle pedal of FIG. 1 in the open position.
Figure 4:
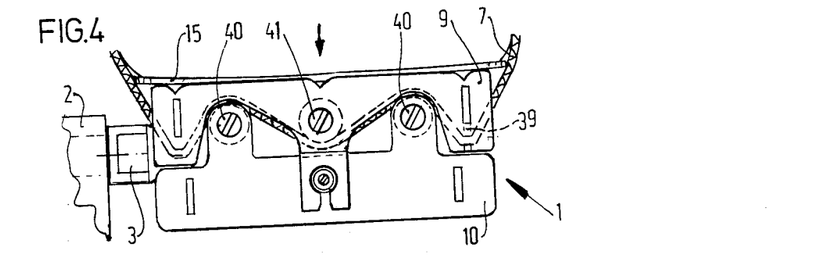
FIGS. 4 and 5 are left-hand elevational views of the pedals shown in FIGS. 1 and 2 respectively.
Figure 5:
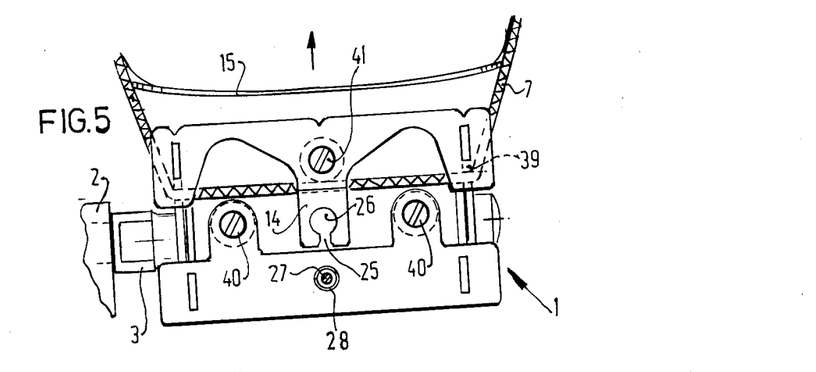

From FIGS. 4 and 5 it will be apparent that the belt 7 of the foot holder 5 extends at the rear end of the pedal body 4 transversely across the upper pedal 9. The upper pedal 9 has to this end openings 39 serving as guide means. The upper pedal 9 and the lower pedal 10 are relatively movable about the pivotal shaft 11 between a closed position shown inter alia in FIGS. 1 and 4 and an open position shown inter alia in FIGS. 2 and 5. According to the invention the bicycle pedal 1 furthermore comprises locking means 12 by which the upper pedal 9 and the lower pedal 10 can be retained in the closed position.

The lower pedal 10 comprises pins 40 serving as extensions at the rear end of the pedal body 4. The upper pedal 9 comprises a pin 41 located between the pins 40. The pins 40 and 41 are positioned with respect to the openings 39 in a manner such that in the open position of the pedal body the belt 7 extends substantially straight between the openings 39 on both sides. In the closed position the belt 7 is urged into the zigzag shape shown in FIG. 4 by the pins 40 and the openings 39. The tightening means formed by the openings 39 and the pins 40, 41 thus tighten the foot holder during the movement from the open to the closed position. When the belt 7 is once adjusted to the shoe 15 in the closed position of the pedal body so that the shoe 15 is retained in said position, the belt 7 will release the shoe 15 at the transition from the closed to the open position of the pedal body, since the zigzag belt portion is set free. When afterwards the shoe 15 is again inserted into the foot holder in the direction of the arrow 16 and the pedal body is pressed into the closed position by exerting a force in the direction of the arrow 17, the shoe is again retained by the foot holder 5.

In the embodiment shown the locking means 12 comprise a longitudinally slidable locking pin 35 arranged in the lower pedal part 10. This locking pin 35 has at the rear end a thick portion 28 and a thin portion 27. With the locking pin 35 is co-operating a locking tongue 14 connected with the upper pedal 9. The locking tongue 14 has an opening 26 which is accessible from below through a slot 25. The slot 25 is narrower than the diameter of the opening 26. The thick portion 28 of the locking pin fits in the opening 26. The thin portion 27 can pass through the slot 25. The locking pin 35 is loaded by a tension spring 30, which urges the locking pin to the rear. The locking tongue 14 has a length and shape such that when the upper pedal 9 is pressed down out of the open position shown in FIG. 2 with respect to the lower pedal 10, the tongue 14 with the slot 25 engages the thin portion 27 of the locking pin 35. At the further depression the locking pin is pressed inwardly by wedge effect against the tension spring 30 until the opening 26 is coaxial with the locking pin 35. By the action of the tension spring 30 the locking pin 35 is again urged outwardly so that the thick portion 28 snaps into the opening 26 of the locking tongue 14. In this position the upper pedal 9 is locked on the lower pedal 10. The thin portion 27 of the locking pin 35 is provided with a push button 13 by means of which the locking pin can be urged inwards. Upon this movement the thick portion 28 slides out of the opening 26 and the upper pedal can again move upwards with respect to the lower pedal 10, since the slot 25 passed beyond the thin portion 27 of the locking pin 35.

Apart from the manual actuation described above for rendering the locking means 12 inoperative first releasing means may be used for putting the locking means 12 out of operation. These first releasing means become operative upon a rotation opposite the normal, relative rotation of the pedal body and the pedal shaft. In other terms the first releasing means become operative in back pedalling, the crank arm 2 moving in the direction of the arrow 36 and the crank shaft 3 moving in the direction of the arrow 37 with respect to the pedal body 4.

Figure 3:
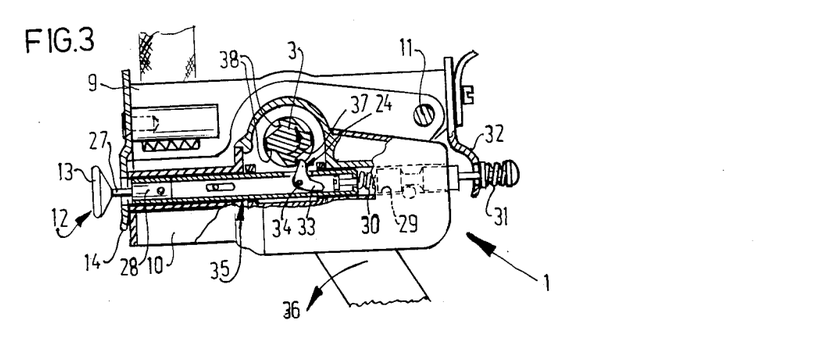
FIG. 3 is a sectional view of the bicycle pedal shown in FIGS. 1 and 2.

The first releasing means 24 comprise a pawl 33 and extensions 38 on the pedal shaft 3. The pawl 33 is L-shaped and pivotally connected by means of a shaft 34 with the locking pin 35. The forwardly protruding limb of the pawl 33 serves as a stop, thereas the upwardly protruding limb of the pawl 33 extends in the path of the extensions 38. It will be obvious that upon a relative rotation of the pedal shaft 3 in a direction opposite the arrow 37 the pawl 33, when passing by an extension 38, can freely tilt about the pivotal shaft 34. Upon rotation of the pedal shaft 3 with respect to the pedal body 4 in the direction of the arrow 37 one of the extensions 38 pushes the pawl 33, which thus catches the locking pin 35 and displaces it to the right as viewed in FIG. 3. This right-hand displacement results in that the thick portion 28 of the locking pin 35 moves out of the opening 26 so that the pedal body 4 can get into the open position.

Figure 6:
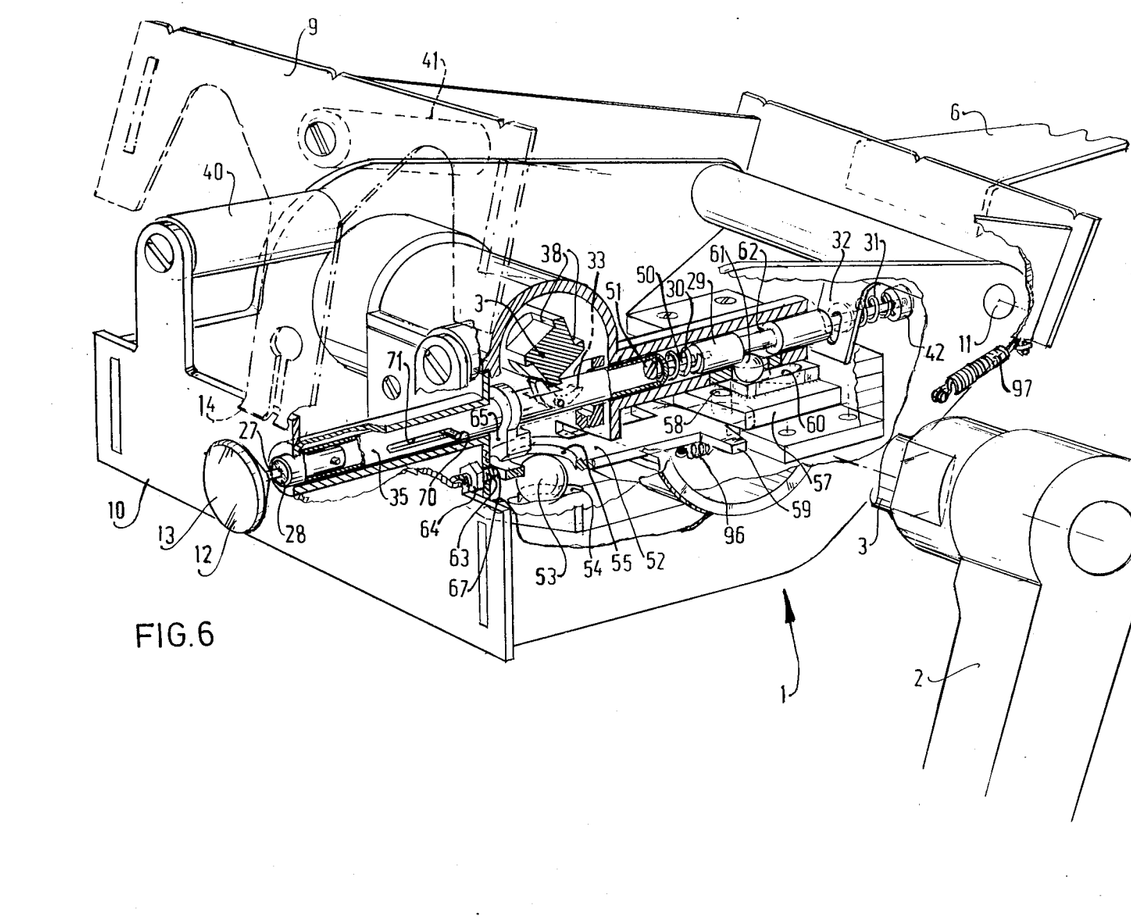
FIGS. 6 and 7 are enlarged, perspective views of the bicycle pedal, some parts being omitted.

In the embodiment of the invention shown the bicycle pedal furthermore comprises second releasing means which are actively connected with locking means and become automatically operative in the event of a spill. These second, releasing means are clearly illustrated in FIGS. 6 and 7. They comprise inter alia a catch 29 aligned to the locking pin 35. The catch 29 has at the front end a protruding pin having a head 42. The pin extends across a support 32 rigidly connected with the pedal body 4. Between the head 42 and the support 32 is arranged a releasing spring 31. This releasing spring 31 continuously exerts a forward force on the catch 29. The catch 29 is held in place by a retractable guard element formed by a ball 61. The tension spring 30 bears on the rear end of the catch 29. Consequently the catch 29 normally serves as a stop for said spring 30. In the rear end of the catch 29 is provided a screw 50 having a head 51. The head 51 extends in the hollow locking pin 35 and can come into contact with a rear wall of the locking pin 35. It will be obvious that, when the guard ball 61 is withdrawn and the catch 29 can freely move forwards under the action of the releasing spring 31, the head 51 of the screw 50 shifts the locking pin 35 forwards so that again the thick portion 28 of the locking pin 35 is shifted out of the opening 26 of the locking tongue 14 and the upper pedal 9 can move upwards with respect to the lower pedal 10.

Figure 7:
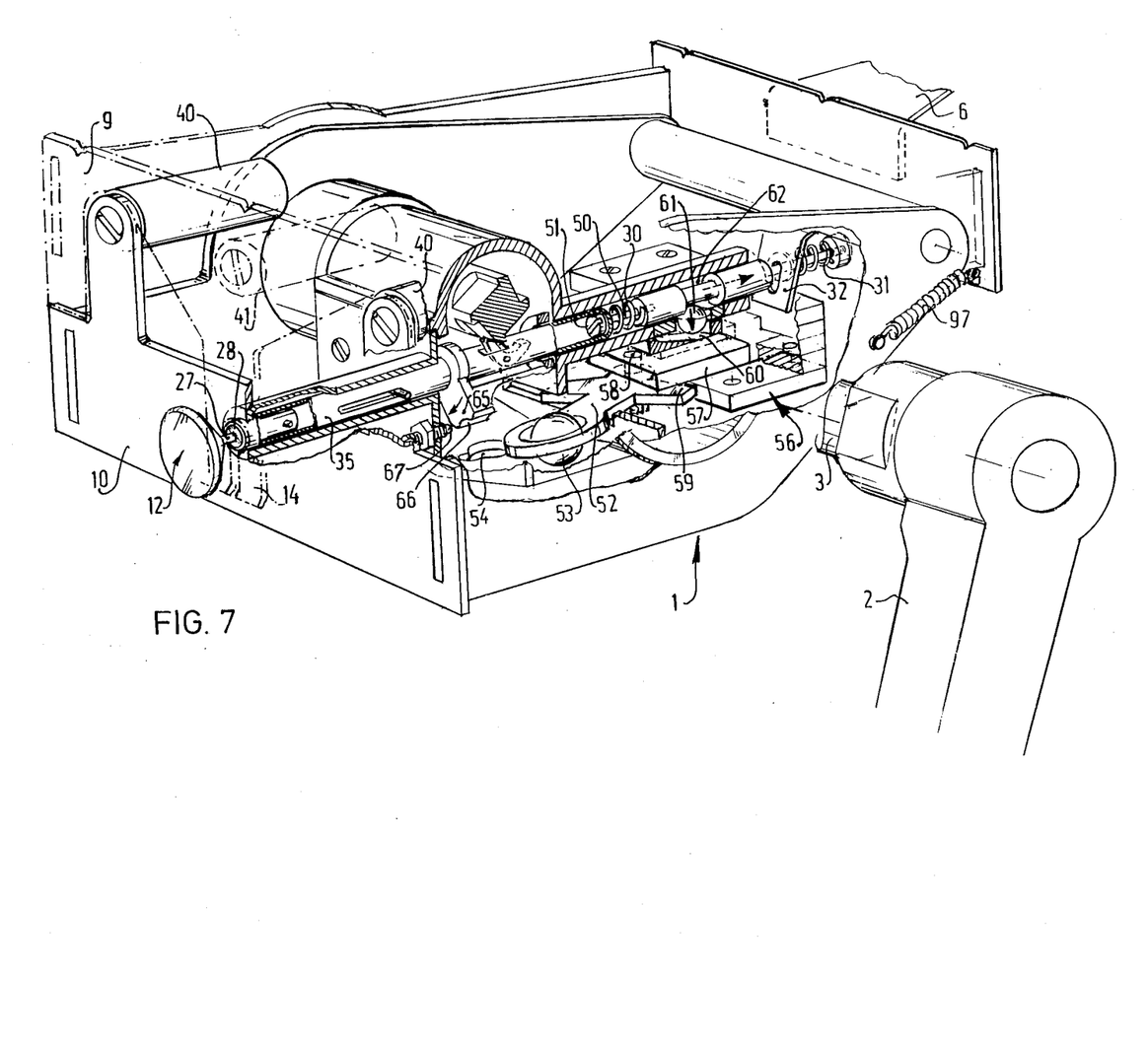

The second releasing means furthermore comprise an inertia element in the form of a ball 53 and transmission means converting a lateral movement of the ball 53 toward the side of pedal body 4 into a retractive movement of the guard ball 61. These transmission means are formed by an arm 52, a slide 57 pivotally connected by a pivot pin 58 with the arm and being slidable in a guide block 56 and a profile cavity 60 formed in the slide 57. The arm 52 has side arms 59 adapted to bear on the guide block 56. From FIG. 7, illustrating the state of the second releasing a spill, drop or falldown of the bicycle which involves means at the occurrence of a movement of the pedal body 4 in a direction to cause a lateral acceleration, it will be apparent that as a result of this lateral acceleration the ball 53 shifts laterally in place. This lateral acceleration takes place at approximately a right angle to the forward motion of the bicycle. With this lateral shift the arm 52 is turned about the pivot pin 58 until the side arm 59 comes into contact with the guide block 56. At a further lateral movement of the ball 53 the contact point of the side arm 59 with the guide block 56 functions as a tilting point and the slide 57 is drawn to the rear on the pivot pin 58. The profile cavity 60 is designed so that it has a forwardly sloping body so that during a rearward shift of the slide 57 the guard ball 61 can move downwards. Thus the ball 61 moves out of the recessed part 62 of the catch 29 so that under the action of the releasing spring 31 it can move forwards in the manner described above.

The arm 52 is furthermore engaged by a reset spring 96. When the lateral acceleration ceases, this reset spring 96 tends to retract the arm 52 and the slide 57 into the position shown in FIG. 6. Owing to the action of the spring 96 the narrow portion 62 of the catch 29 again gets above the guard ball 61 and the guard ball 61 can move back into its guarding position. The second releasing means are upright.

In order to prevent the ball 53 from unlocking the pedal body even at very slight lateral accelerations occurring in normal use, the lower pedal 10 is provided, with a seat 54 for the ball 53. This seat has the shape of a slot extending in the direction of length and having in the middle a widened part in which the ball is normally located. Therefore, the second releasing means become operative only in an inclined position of the bicycle such that the ball 53 moves out of the seat 54 and the arm 52 engages the opening 55. The locking pin 35 is surrounded by a locking member holding the ball in the seat. This locking member 65 is freely pivotable about the locking pin 35. Therefore, at the occurrence of a lateral acceleration or a spill the locking member 65 will deflect in the manner illustrated in FIG. 7 so that the ball 53 is left free.

In order to prevent the locking member 65 from swinging around the locking pin 35 in the event of fast rotation of the pedals, the locking member 65 has, on the underside, a groove-like recess 66. At the occurrence of vigourous movements of the pedal the ball 53 will move forwards or backwards in the seat 54 and slightly upwards. The ball 53 thus protrudes in the groove 66 so that the locking member 65 cannot swing.

In order to set the correct position of the profile cavity 60 with respect to the guard ball 61 in the rest position the lower pedal is provided with a stop bolt 63, which comes into contact with the rear end of the arm 52 and thus determines the longitudinal position thereof and hence the longitudinal position of the slide 57. The stop bolt 63 having a rotatable ball 67 at its active end is held in the desired position by means of a guard nut 64.

It is furthermore shown in the Figures that the locking pin 35 is prevented from rotation about its longitudinal axis by a guard pin 70, which engages a longitudinal slot 71 of the locking pin 35. It is thus ensured that at any time the pawl 33 is in the correct position.

Figure 8:
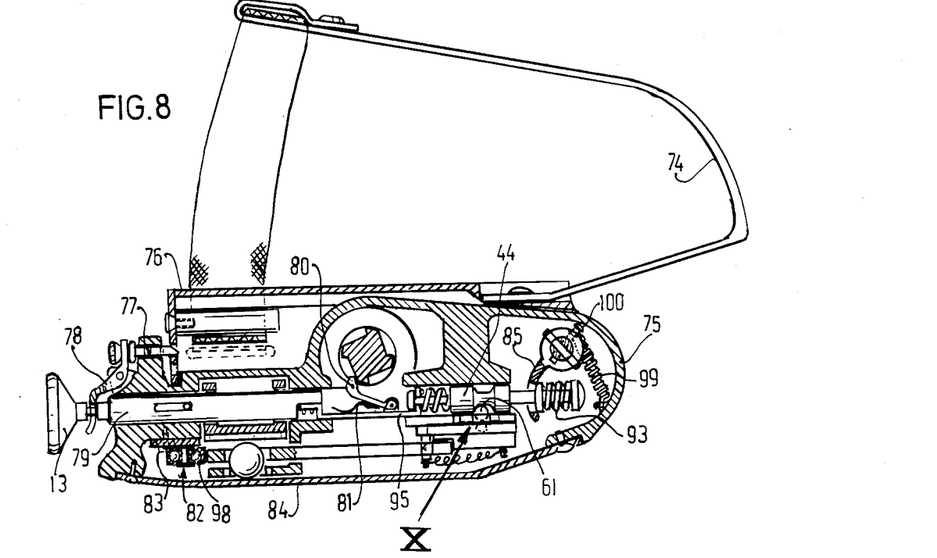
FIG. 8 is a sectional view like FIG. 3 of a preferred embodiment of the bicycle pedal in accordance with the invention.
Figure 9:
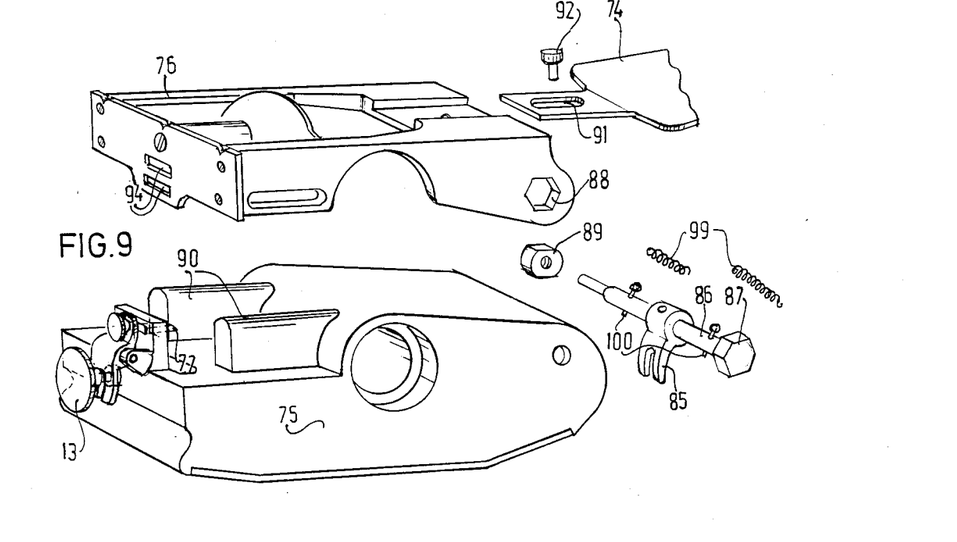
FIG. 9 is a perspective view, parts of the bicycle pedal shown in FIG. 8 being dissembled.

The embodiment of the invention illustrated in FIGS. 1 to 7 constitutes one of the many potential combinations of structural designs. In a simpler embodiment, for example, the push button for manual actuation may be omitted. Moreover, the locking means may be designed quite differently and the extensions on the pedal shaft may be obtained, as an alternative of the provision of recesses, by using a separate gear wheel A preferred embodiment of the invention in which other solutions are chosen for various structural aspects is illustrated in FIGS. 8 to 10.

The lower pedal 75 of this embodiment is an integrity of light metal or synthetic resin spray-cast, cast or pressed. The upper pedal 76 is also a single unit and is pressed. The foot holder 74 has a limb having a slot 91 so that the foot holder 74 can be adjustably mounted by the bolt 92 on the upper pedal 76. In this embodiment the releasing spring 93 bears on a fork 85, which is rigidly fastened to a pivot bolt 86. The pivot bolt 86 has a hexagonal head 87, which is engaged in a hexagonal hole 88 in the upper pedal 76. Onto the other end of the bolt 86 is screwed a nut 89. The bolt 86, and hence the fork 85 are thus unrotatably connected with the upper pedal 76. When the pedal parts move towards the open position under the action of the springs 99 arranged between the lower pedal 75 and pins 100 radially protruding from the bolt 86, the fork 85 will thus move to the rear with respect to the position shown in FIG. 8, the releasing spring 93 thus being relaxed. When subsequently the pedal parts move into the closed position, the releasing spring 93 is again stretched. The second releasing means again get automatically into the operational state when the bicycle is put up after a fall. Since the lower pedal 75 is integrally cast or pressed, ridges 90 can be simultaneously formed, which serve as extensions for guiding the belt of the foot holder into the zigzag shape.

In this embodiment the locking means are also designed otherwise. The lock bolt is formed herein by a slide 77 actuated by a lever 78. This slide 77 comes into engagement with a slot 74 of the upper pedal 76. By using a plurality of slots in superposition the tension of the belt can be adjusted to different values in dependence on the pedal pressure. It should be noted that instead of using slots cams may be employed. In contrast to the locking pin 35 of the preceding embodiment the switching shaft 79 has a massive structure. The pawl 80 is arranged in a bridging part 95. The pawl 80 is loaded by a leaf spring 81. In this embodiment the assembly may have a slightly flatter shape. For setting the rest position of the guard ball 61 an eccentric disc 82 is used, which is fastened with the aid of a bolt 83. This eccentric disc 82 has a readily running bearing 98, the outer race of which is in contact with the arm. On the underside the lower pedal 75 is closed with the aid of a cover 85. The releasing means are thus protected against dirt.

Figure 10:
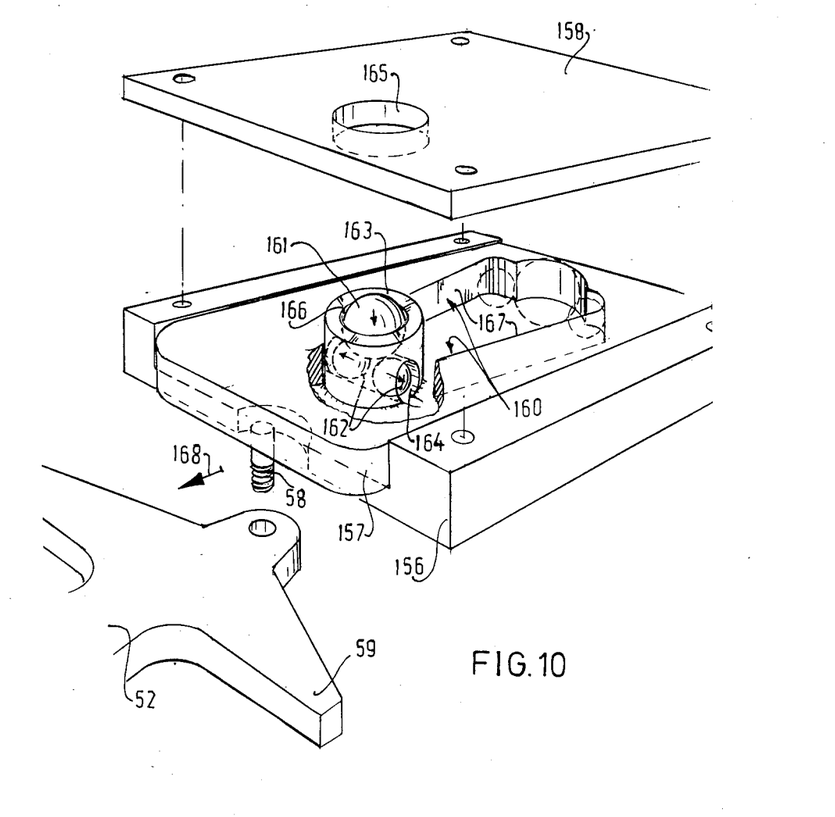
FIG. 10 is an enlarged, perspective view, parts of detail X of FIG. 8 being dissembled.

The second releasing means, clearly shown in FIG. 10, are also designed otherwise in this embodiment. In the guide block 156 is enclosed a slide 157 by means of a cover plate 158. The slide 157 is connected in the same manner as in the embodiment described above by a pivot pin 58 with the arm 52. A guard ball 161 is housed in a vertical bore 166 of a sleeve 163, which is integral with the guide block 156. The cover 158 has a bore 165 through which can pass the sleeve 163. The profile cavity 160 has a flaring shape. The diverging walls 167 of the profile cavity 160 constitute guide faces for balls 162, which are slidably arranged in a transverse bore 164 intersecting the bore 166. The balls 162 have a smaller diameter than the ball 161.

The second releasing means operate as follows. When the slide 157 is drawn in the direction of the arrow 168 at a pivotal movement of the arm 52, the wall 167 move relatively away from the bore 164 in the sleeve 163. Since the guard ball 161 exerts a downward force, the balls remaining in contact with the walls 167 in the bore 164 move away from one another so that the guard ball 161 moves downwards in the bores 166. In the fully drawn-out position of the slide 157 the balls 162 have moved outwards to an extent such that the guard ball 161 is left completely free by the balls 162. This relative position is indicated in FIG. 10 by broken lines.

At a return movement of the slide 157 the balls 162 are urged inwardly by the walls 167 of the cavity 160. Thus the guard ball 161 is urged upwards by the balls 162 into the operative position.

The mass of the push button 13 and the switching shaft 79 in common may be so large with respect to the friction to be overcome that at a transgression of a given deceleration in the direction of travel (front collision) unlocking automatically occurs.

The mass distribution of the pedal shown in FIGS. 8 and 9 may be chosen so that in the rest position the pedal is substantially horizontal so that it is always ready to receive the foot, which facilitates the use.

I claim:

1. A bicycle pedal comprising a pedal shaft rigidly connectable with a crank arm of a bicycle, a pedal body having a front end and a rear end rotatably journalled on said pedal shaft and having a normal relative rotation about said pedal shaft and a tightenable foot holder connected with said pedal body characterized in that said pedal body comprises two pedal parts relatively movable between an open position and a closed position, tightening means including a portion connected with each of said pedal parts and responsive to relative movement of said two pedal parts for tightening said foot holder during said movement from the open to said closed position and manually operable locking means retaining said pedal parts in said closed position.

2. A bicycle pedal as claimed in claim 1 characterized by first releasing means actively connected with said pedal shaft and said locking means and becoming operative upon a rotation opposite said normal relative rotation between said pedal body and said pedal shaft for rendering said locking means inoperative.

3. A bicycle pedal as claimed in claim 1 characterized by inertia operated releasing means actively connected with said locking means, comprising a laterally movable inertia element and becoming operative at the occurrence of a lateral spill acceleration.

4. A bicycle pedal as claimed in claim 1 characterized in that said locking means comprise a plurality of locking members locking said pedal parts.

5. A bicycle pedal as claimed in claim 1 characterized in that said pedal parts comprise a lower pedal rotatably journalled on said pedal shaft and an upper pedal connected herewith so as to be pivotal at a front end between said open and said closed position, in that said upper pedal comprises guide means for guiding a flexible belt portion of said foot holder transversely across a rear end of said upper pedal opposite said front end and in that at least said lower pedal has, near a rear end, extensions leaving said belt portion free in said open position and urging it into a zigzag shape in said closed position.

6. A bicycle pedal as claimed in claim 1 characterized in that said locking means comprise a slidable locking pin extending in the direction from said front to said rear end and being urged by a tightening spring into an operative position.

7. A bicycle pedal comprising a pedal shaft rigidly connectable with a crank arm of a bicycle, a pedal body having a front end and a rear end rotatably journalled on said pedal shaft and having a normal relative rotation about said pedal shaft and a tightenable foot holder connected with said pedal body characterized in that said pedal body comprises two pedal parts relatively movable between an open position and a closed position, tightening means connected with said pedal parts and tightening said foot holder during the movement from said open to said closed position, manually operable locking means retaining said pedal parts in said closed position, said locking means comprise a slidable locking pin extending in the direction from said front to said rear end and being urged by a tightening spring into an operative position, and a first releasing means comprise a pawl connected with said locking pin and at least one extension on said pedal shaft engaging said pawl upon an opposite rotation to said normal relative rotation and displacing said locking pin against the action of said tightening spring.

8. A bicycle pedal comprising a pedal shaft rigidly connectable with a crank arm of a bicycle, a pedal body having a front end and a rear end rotatably journalled on said pedal shaft and a tightenable foot holder connected with said pedal body characterized in that said pedal body comprises two pedal parts relatively movable between an open position and a closed position, tightening means connected with said pedal parts and tightening said foot holder during the movement from said open to said closed position, manually operable locking means retaining said pedal parts in said closed position, said locking means comprise a slidable locking pin extending in the direction from said front to said rear end and being urged by a tightening spring into an operative position, an inertia operated releasing means comprise a catch movably arranged in said pedal body and having a member adapted to engage said locking means, a retractable guard element retaining said catch in a rest position, a releasing spring urging said catch into a position in which said locking means are released and transmission means retracting said guard element upon a lateral movement of an inertia element and being connected with said guard element and said inertia element.

9. A bicycle pedal as claimed in claim 8 characterized in that said guard element is a guard ball slidably engaged in a main bore and in that said transmission means comprise two auxiliary balls of smaller diameter engaged in a transverse bore intersecting said main bore, a slide movably connected with said inertia element and guide faces formed at said slide and moving in a diverging manner along the distal sides of said auxiliary balls during the unlocking movement.

10. A bicycle pedal as claimed in claim 8 characterized in that said catch has a stop face for said tightening spring.

11. A bicycle pedal as claimed in claim 8 characterized in that said releasing spring is in engagement with a tightening arm rigidly fastened to the other pedal part than that comprising the catch.

12. A bicycle pedal comprisng a pedal shaft rigidly connectable with a crank arm of a bicycle, a pedal body rotatably journalled on said pedal shaft and a tightenable foot holder connected with said pedal body characterized in that said pedal body comprises two pedal parts relatively movable between an open position and a closed position, tightening means having a portion connected with each of said pedal parts and responsive to relative movement of said pedal parts for tightening said foot holder during the movement from said open to said closed position, manually operable locking means retaining said pedal parts in said closed position and the mass distribution of said pedal body, said foot holder, said tightening means and said locking means is chosen so that the weight of said pedal is balanced with regard to said pedal shaft and in the rest position said pedal is substantially horizontal.

13. A bicycle pedal comprising a pedal shaft having an axis rigidly connectable with a crank arm of a bicycle, a pedal body rotatably journalled on said pedal shaft about said axis of said pedal shaft, a tightenable foot holder connected with said pedal body, said pedal body includes two pedal parts connected by a pivotal connection to each other said pivotal connection having an axis, with said axis of said pivotal connection being parallel to said axis of said pedal shaft, said pedal parts being relatively movable between an open position and a closed position, tightening means having a portion connected with each of said pedal parts and responsive to relative movement of said pedal parts for tightening said foot holder during the movement from said open to said closed position, and manually operable locking means retaining said pedal parts in said closed position.

* * * * *